US008948181B2

(12) United States Patent
Kapadia et al.

(10) Patent No.: US 8,948,181 B2
(45) Date of Patent: Feb. 3, 2015

(54) SYSTEM AND METHOD FOR OPTIMIZING NEXT-HOP TABLE SPACE IN A DUAL-HOMED NETWORK ENVIRONMENT

(71) Applicant: Cisco Technology, Inc., San Jose, CA (US)

(72) Inventors: Shyam Kapadia, Santa Clara, CA (US); Nilesh Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 13/658,610

(22) Filed: Oct. 23, 2012

(65) Prior Publication Data

US 2014/0112122 A1 Apr. 24, 2014

(51) Int. Cl.
*H04L 12/28* (2006.01)
*H04L 12/741* (2013.01)

(52) U.S. Cl.
CPC .................................. *H04L 45/74* (2013.01)
USPC ........................................................ 370/392

(58) Field of Classification Search
USPC ......... 370/254, 352, 386, 389, 395.5–395.54, 370/428, 465–467, 469, 475
See application file for complete search history.

(56) References Cited

U.S. PATENT DOCUMENTS

| | | | |
|---|---|---|---|
| 6,256,314 B1 | 7/2001 | Rodrig et al. | |
| 6,934,260 B1 | 8/2005 | Kanuri | |
| 7,079,537 B1 | 7/2006 | Kanuri et al. | |
| 8,204,061 B1 | 6/2012 | Sane et al. | |
| 8,694,664 B2 * | 4/2014 | Jain et al. | 709/230 |
| 2007/0028070 A1 | 2/2007 | Avergun et al. | |
| 2007/0081530 A1 | 4/2007 | Nomura et al. | |
| 2010/0316053 A1 | 12/2010 | Miyoshi et al. | |
| 2012/0014386 A1 | 1/2012 | Xiong et al. | |
| 2012/0027017 A1 * | 2/2012 | Rai et al. | 370/392 |
| 2012/0236761 A1 | 9/2012 | Yang et al. | |
| 2013/0039218 A1 | 2/2013 | Narasimhan et al. | |
| 2013/0094357 A1 * | 4/2013 | Sankar et al. | 370/230 |
| 2013/0194964 A1 | 8/2013 | Basso et al. | |
| 2013/0308641 A1 | 11/2013 | Ackley | |
| 2014/0044126 A1 * | 2/2014 | Sabhanatarajan et al. | 370/354 |

OTHER PUBLICATIONS

U.S. Appl. No. 13/682,534, filed Nov. 20, 2012 entitled "System and Method for Optimizing Within Subnet Communication in a Network Environment," Inventors: Shyam Kapadia, et al.

(Continued)

*Primary Examiner* — Frank Duong
(74) *Attorney, Agent, or Firm* — Patent Capital Group

(57) ABSTRACT

A method for optimizing next-hop table space in a dual-homed network environment is provided and includes associating an Emulated Switch Internet Protocol (ES-IP) address and an Emulated Switch Media Access Control (ES-MAC) address with an Emulated Switch Identifier (ES-ID) of an emulated switch connected to a dual-homed host having a host IP address in a network environment, and populating a host route table with a mapping between the host IP address and the ES-IP address. The method further includes receiving an outgoing packet with the host IP address as a destination address, determining the ES-IP address corresponding to the host IP address, sending out an ARP request for a MAC address corresponding to the ES-IP address, receiving the ES-MAC address, determining the ES-ID corresponding to the ES-MAC address, encapsulating the outgoing packet with the ES-ID, and forwarding the packet.

20 Claims, 7 Drawing Sheets

(56) References Cited

OTHER PUBLICATIONS

"Brocade VCS Fabric Technical Architecture," Brocade Communications Systems, Data Center Technical Brief, Aug. 2012; 64 pages.
Cisco Systems, Inc., "Cisco Nexus 5000 Series NX-OS Operations Guide, Release 5.1(3)N1(1) Glossary," Jun. 11, 2012; 5 pages.
Cisco Systems, Inc., "Chapter 13: Configuring the MAC Address," Cisco Nexus 5000 Series Switch CLI Software Configuration Guide, Apr. 2012.
Cisco Systems, Inc., "Cisco FabricPath Design Guide: Using FabricPath with an Aggregation and Access Topology," Dec. 2011 ; 54 pages.
Cisco Systems, Inc., "Layer 2 Multi-Path (L2MP) Overview," Presentation, Jul. 2011; 48 pages.
Cisco White Paper, "Cisco FabricPath for Cisco Nexus 7000 Series Switches," Cisco Systems, Inc., Sep. 7, 2011, 44 pages.
Hinden, R., et al. "IP Version 6 Addressing Architecture," Internet Engineering Task Force, Request for Comments 4291, Feb. 2006.
Zhang, Mingui, "To Address the Space Limitation of Inner VLAN," Internet Draft draft-zhang-trill-vlan-extension-00.txt, May 31, 2011.
U.S. Appl. No. 13/633,734, filed Oct. 2, 2012 entitled "System and Method for Hardware-Based Learning of Internet Protocol Addresses in a Network Environment," Inventors: Shyam Kapadia, et al.
Himanshu Shah et al., "ARP Broadcast Reduction for Large Data Centers," Oct. 25, 2010, 12 pages; http://tools.ietf.org/html/draft-shah-armd-arp-reduction-01.
Aled Edwards et al., "Diverter: A New Approach to Networking Within Virtualized Infrastructures," WREN'09, Proceedings of the 1st ACM workshop on Research on enterprise networking, Barcelona, Spain, Aug. 21, 2009, 8 pages.
Changhoon Kim, et al., "Floodless in SEATTLE: A Scalable Ethernet Architecture for Large Enterprises," SIGCOMM '08 Proceedings of the ACM SIGCOMM 2008 conference on Data communication, Seattle, WA, Aug. 17-22, 2008, 14 pages.
Fulcrum Microsystems, "FocalPoint in Large-Scale Clos Switches: A new silicon generation enables a new datacenter switching paradigm," White Paper, Oct. 2007, 10 pages; www.fulcrummicro.com/product_library/applications/clos.pdf.
R.N. Mysore, et al., "PortLand: A Scalable Fault-Tolerant Layer 2 Data Center Network Fabric," Proceedings of Proceedings of the ACM SIGCOMM 2009 conference on Data communication, SIGCOMM'09, Barcelona, Spain, Aug. 17-21, 2009, 12 pages.
N. J. Lippis, III, "A simpler Data Center Fabric Emerges for the Age of Massively Scalable Data Centers," Jun. 2010, 12 pages; http://www.cisco.com/en/US/prod/collateral/switches/ps9441/ps9402/Data_Center_Net_Fabric.pdf.
USPTO Jul. 16, 2014 Non-Final Office Action from U.S. Appl. No. 13/633,734.
USPTO Sep. 12, 2014 Non-Final Office Action from U.S. Appl. No. 13/682,534.

\* cited by examiner

SYSTEM AND METHOD FOR OPTIMIZING NEXT-HOP TABLE SPACE IN A DUAL-HOMED NETWORK ENVIRONMENT

TECHNICAL FIELD

This disclosure relates in general to the field of communications and, more particularly, to a system and a method optimizing next-hop table space in a dual-homed network environment.

BACKGROUND

Data centers are increasingly used by enterprises to achieve an effective collaboration and a viable interaction with network elements. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for optimizing next-hop table space in a dual-homed network environment is provided and includes associating an Emulated Switch Internet Protocol (ES-IP) address and an Emulated Switch Media Access Control (ES-MAC) address with an Emulated Switch-IDentifier (ES-ID) of an emulated switch directly connected to a dual-homed host having a host IP address in a network environment. The emulated switch includes a first switch and a second switch. The method further includes populating a host route table of a third switch with a mapping between the host IP address and the ES-IP address.

In particular embodiments, the method can also include receiving an outgoing packet at the third switch, where the outgoing packet includes the host IP address as a destination address, determining, from the host route table, the ES-IP address corresponding to the host IP address, sending out an Address Resolution Protocol (ARP) request for a Media Access Control (MAC) address corresponding to the ES-IP address, receiving the ES-MAC address, determining the ES-ID corresponding to the ES-MAC address, encapsulating the outgoing packet with the ES-ID, and forwarding the packet to a fourth switch in the network environment.

In a specific embodiment, the first, second and third switches may be Top of Rack (ToR) switches and the fourth switch may be a spine switch, with the network environment having a leaf/spine topology with overlay based architecture using Link State Routing Protocols. In some embodiments, if a link from the dual-homed host to the first switch fails, traffic is forwarded to the dual-homed host exclusively through the second switch. In other embodiments, if a link from the dual-homed host to the first switch fails, a second switch IP address may be advertised as a next hop address via a routing protocol, and other features.

Example Embodiments

Figure 1:
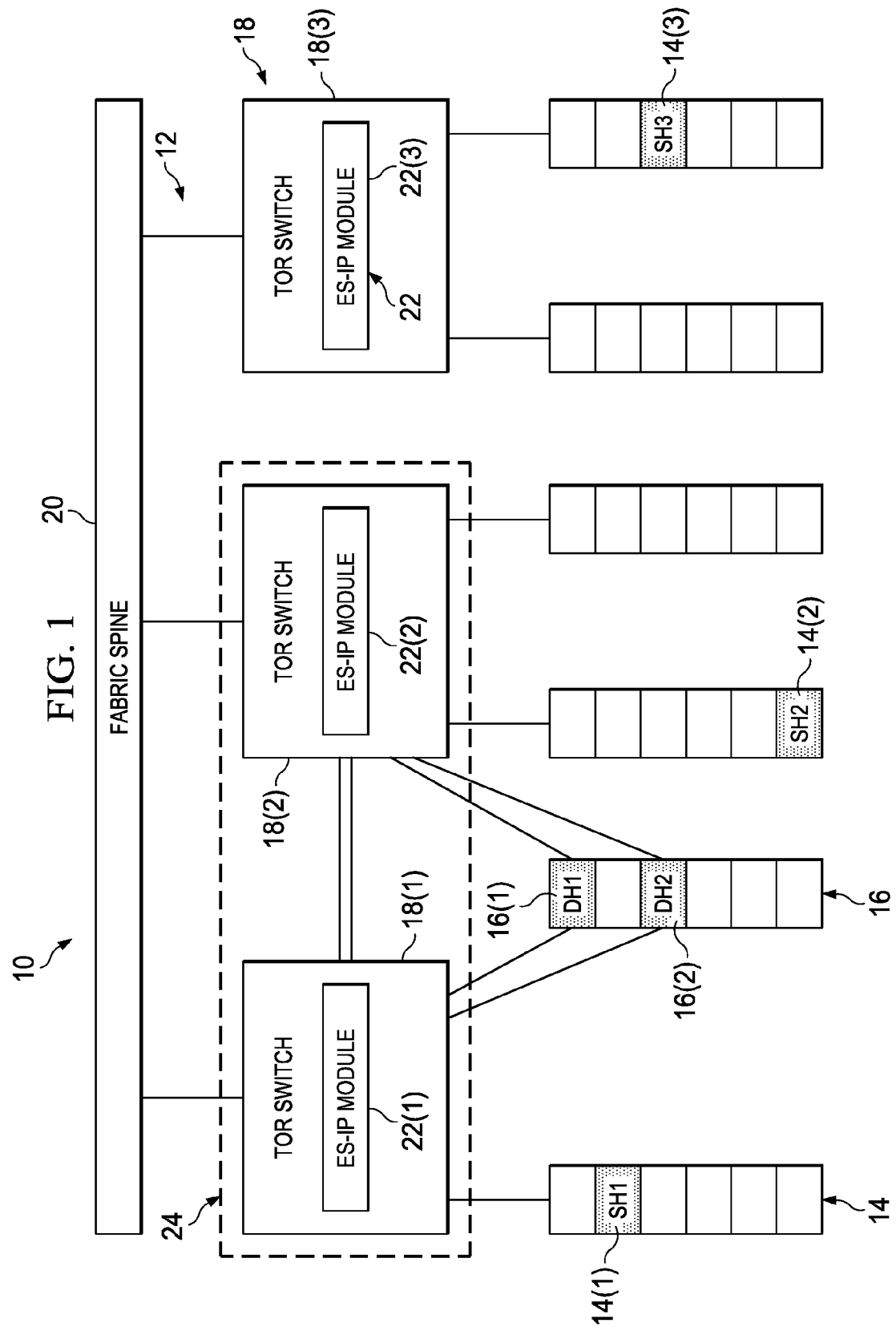
FIG. 1 is a simplified block diagram illustrating a system for optimizing next-hop table space in a dual-homed network environment.

Turning to FIG. 1, FIG. 1 is a simplified block diagram illustrating a communication system 10 for optimizing next-hop table space in a dual-homed network environment. Communication system 10 includes a network 12 (generally indicated by an arrow), comprising a plurality of single-homed hosts 14 (e.g., hosts 14(1)-14(3)) and dual-homed hosts 16 (e.g., hosts 16(1)-16(2)) connected to Top of Rack (ToR) switches 18 (e.g., ToR switches 18(1)-18(3)). The network topology of network 12 includes a fabric spine 20 connecting the plurality of ToR switches 18. Each of ToR switches 18 includes an Emulated Switch Internet Protocol (ES-IP) module 22 (e.g., ES-IP module 22(1)-22(3)).

At least some of ToR switches 18 in network 12 may form emulated switches that connect to dual-homed hosts 16. By way of example, and not as a limitation, an emulated switch 22 includes ToR switches 18(1) and 18(2) connected to dual-homed hosts 16(1) (DH1) and 16(2) (DH2). ToR switch 18(1) may also be connected to single-homed hosts 14 (also called orphan hosts), such as host 14(1)(SH1). Similarly, ToR switches 18(2) and 18(3) may also be connected to single-homed hosts 14, such as host 14(2)(SH2) and host 14(3) (SH3), respectively. ToR switches 18(1)-18(3) may be connected to a plurality of other dual-homed and single-homed hosts, within the broad scope of the embodiments. According to various embodiments, ES-IP modules 22 may enable Layer 3 termination at ToR switches 18 with efficient use of hardware space.

Certain terminologies are used with regard to the various embodiments of communication system 10. As used herein, the term "host" may include any network element, physical or virtual, connected to other network elements over a network. Hosts may provide data and other services to the network elements. In a client-host model, hosts may include hosts. In a peer-to-peer network, each computer may be a host. Hosts may also include computers participating in networks that use Internet Protocol (IP). In a general sense, each host has a specific, unique address (e.g., IP address) associated therewith. Hosts can include physical computers (e.g., hosts), and virtual machines (VMs).

As used herein, the term "network element" can encompass computers, network appliances, hosts, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

As used herein, the term "ToR switch" is inclusive of routers, switches and such other network elements with packet routing, bridging, and switching functionalities that are directly connected to one or more hosts 14. The term "fabric spine" is inclusive of routers, switches and such other network elements with packet routing, bridging, and switching functionalities that connect one or more ToR switches 18.

As used herein, the term "emulated switch" can include a construct that emulates a pair of ToR switches as a single switch to the rest of the network (e.g., network 12). For example, emulated switch 22 includes ToR switches 18(1) and 18(2), which appear as a single switch to dual-homed hosts 16(1) and 16(2), and to other ToR switches (e.g. ToR switch 18(3)). In a particular embodiment, dual-homed hosts 16(1) and 16(2) may be connected to ToR switches 18(1) and 18(2) via virtual PortChannel Plus (vPC+) links. In other embodiments, dual-homed hosts 16(1) and 16(2) may be connected to ToR switches 18(1) and 18(2) via EtherChannel or other link aggregation technology that allows groups of several physical links (e.g., Ethernet links) to appear as a single logical link. Emulated switch 22 can also include peer links that synchronize states and exchange Media Access Control (MAC) address information between peers (e.g., constituent members of the emulated switch) ToR switches 18(1) and 18(2).

In various embodiments, ToR switches 18(1)-18(3) may be interconnected with an arbitrary topology. In such arbitrary topologies, emulated switch 22 may apply when packet forwarding uses an overlay header (e.g., for scalability purposes) and the host address information is delivered to substantially all ToR switches 18(1)-18(3) via suitable routing or distribution protocol.

For purposes of illustrating the techniques of communication system 10, it is important to understand the communications in a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A typical data center environment has hosts deployed in racks (typically called PODs), each of the racks beings interfaced by ToR switches (e.g., ToR switches 18). In a leaf/spine network topology, the ToRs are interconnected via a series of spine switches (e.g., fabric spine 20) thereby allowing east-to-west any-to-any communication between the hosts in the data center. For example, the data center network architecture may include a 2-tier spine-leaf topology (extensible to multiple tiers) where there may be a separation between the end-station address space and topology space to allow the two to be independently scaled. In access/aggregation network topology, several access switches (e.g., ToR switches) with Layer 2 forwarding are connected to an aggregation tier (comprising aggregation switches), which implements Layer 3 forwarding.

Layer 2 forwarding (bridging) involves data plane learning, with a flat address space and forwarding table having Media Access Control (MAC) addresses. Flooding is typically required for unknown unicast traffic, and destination MAC addresses should be known for all switches in the same network to avoid flooding. On the other hand, Layer 3 forwarding (routing) involves control plane learning, with a hierarchical address space and forwarding (based on Internet Protocol (IP) addresses). Packets may be forwarded only to destination addresses with matching routes in the forwarding table. Flooding is typically isolated to subnets. Some networks can implement both Layer 2 and Layer 3 forwarding.

Layer 2 and Layer 3 forwarding have different protocol configuration models and thus cannot be simply interchanged in a switch or router. For example, with IP (Layer 3), bridge group interfaces (e.g., Layer 2 interfaces) belong to the same network and have a collective IP network address. In contrast, each routed interface represents a distinct network with its own IP network address. Layer 2 forwarding operates on the MAC frame; Layer 3 forwarding operates on the IP packet.

There is an increasing trend toward having Layer 3 termination on the ToR switches for increased scalability in data center environments. Layer 3 forwarding can be implemented on the ToR switches using a leaf/spine network topology, connected using overlay based architectures that use Link State Routing Protocols. Examples of such network architecture include Transparent Interconnect of Lots of Links (TRILL) and Cisco® FabricPath.

Each switch in such TRILL (or equivalent) networks is typically identified by a switch-identifier ("switch-id"), which can be a unique combination of letters and numerals or other identifying characters that distinguishes a particular switch from other switches in the network. In some networks, the switch-id is dynamically assigned via a Dynamic Resource Allocation Protocol (DRAP). Layer 2 forwarding tables are built based on reachability to each switch-id (as opposed to reachability to a MAC address). A view of the network topology is built using the Link State Routing Protocol such as Intermediate System-to-Intermediate System (IS-IS) routing. The switch-id and topology information may be communicated to the ToR switches and fabric spine using any suitable method (e.g., a central controller). Each ToR switch maintains a MAC address table with the mapping of MAC address to switch-ids (e.g., mapping between host MAC address and switch-id to which the host is directly connected) as well as the local source MACs from its local ports. The mapping associates the locally attached MAC addresses with the local port, and the remote MAC address with the switch-id of the destination switch.

On the fabric spine, there is no MAC address learning of hosts, and the forwarding table is purely switch-id-based. The network topology information may be maintained by Layer 2 IS-IS extensions in the fabric spine. The fabric spine is expected to be lean and may inspect only the outer Layer 2 encapsulation to perform packet switching, and has no visibility into the end station address space. The fabric spine forwards Layer 2 traffic between ToR switches (east-west traffic) exclusively based on the destination switch-id, without learning the MAC addresses of the hosts.

Traffic from ToR switches may be looked up in the Layer 2 forwarding table of the spine switches, and encapsulated into a MAC-in-MAC frame whose destination switch-id is the ToR switch that the destination host is attached to. For example, when a frame enters the fabric spine network, the system encapsulates the Layer 2 frame with a new header. The switch-ID that the system assigns to each switch is used as the outer MAC destination address (ODA) and outer MAC source address (OSA) in the header. In some network topologies (e.g., FabricPath), switch-id is used in the outer header, specifically, the switch-id is encoded as a part of a hierarchical MAC address used in the outer header. In other network topologies (e.g., TRILL) rbridge-IDs operate similar to switch-ids and are populated in the TRILL header.

Dual-homed hosts are becoming increasingly common in such data center deployments. The dual-homed host is connected to at least two ToR switches simultaneously with one or more aggregated links (e.g., Ethernet links). The ToR switches in dual-homed environments are typically deployed as emulated switches, for example, to provide an increased level of redundancy and also allowing for an active-active configuration with respect to the data path. If one switch fails, the traffic flow from and to the dual-homed host is moved to the remaining switch. Data traffic to and from the hosts can be forwarded via either of the ToR switches. The specific ToR switch to forward packets of a flow may be chosen based upon hash algorithms, or other suitable mechanisms, including protocols such as multi-chassis Trunking (MCT). The emulated switch peers may sync dual-homed host information among themselves using suitable protocols (e.g., Cisco Fabric Services protocol over Ethernet) for faster convergence.

The emulated switch is typically assigned an emulated switch-id in addition to regular switch-ids of the peers. The packets forwarded by the emulated switch are sourced with the emulated switch-id. For example, a packet from a dual-homed host may be sourced with the emulated switch-id independent of which peer the packet ingressed on. In contrast, a packet from a non-dual-homed host may be sourced with the regular switch-id of the switch on which the packet ingressed. The other network switches simply see the emulated switch (identified by the dedicated emulated switch-id value) as reachable through both switches of the emulated switch.

Traffic flow with Layer 2 forwarding at ToR switches in a dual-homed network environment such as TRILL (or equivalent networks), can be as follows. Assume that a dual-homed host A on a remote ToR switch S1 sends a Classical Ethernet (CE) frame to host B on emulated switch S23 (comprising ToR peers S2 and S3). Host A has MAC address MAC A and host B has MAC address MAC B. The CE frame with source MAC address MAC A, destination MAC address MAC B may reach ingress switch S1, which may perform a lookup on MAC B in its MAC address table. The MAC lookup indicates that the CE frame should be forwarded to emulated switch-id corresponding to S23. ToR switch S1 may encapsulate the frame in a header with source switch-id S1 and destination switch S23. Switch S1 selects a least cost path and forwards the frame towards a suitable spine switch. The spine switch may simply forward the frame to switch S23 based on its routing table. When switch S23 (either of ToR switches S2 or S3) receives the frame, it removes the header and forwards the frame as a CE frame to Host B.

Currently, data center environments also implement an access/aggregation network topology (as opposed to leaf/spine network topology) where access switches can be dual-homed on aggregation switches using link aggregation technologies. Note that the network topology including dual-homed hosts is different from the network topology including dual-homed switches. In a typical access/aggregation network topology, access/edge switches perform Layer 2 forwarding (exclusively) and Layer 3 termination is at the aggregation layer. TRILL/Fabricpath and other similar overlay based architectures that use Link State Routing Protocols may be implemented between the aggregation tier and the access tier. Typically, two aggregation switches may be configured as an emulated switch with hot standby router protocol (HSRP) enabled. HSRP allows for redundancy so that even if one of the aggregation switches of the emulated switch goes down, Layer 3 connectivity is not lost.

Typically, an HSRP group comprising the emulated switch (comprising the pair of aggregation switches) is configured with a virtual IP (VIP) and the HSRP group maps to a virtual MAC (vMAC) address. The emulated switch peer with an active HSRP control-plane instance (e.g., primary peer) transmits HSRP hellos, sourced from the HSRP vMAC address and destined to the all-HSRP-routers address. The HSRP Hellos contain the emulated switch-id, causing access switches to learn the HSRP vMAC address as being associated with the corresponding emulated switch-id. Switches that are not emulated switches may send out HSRP Hellos using their individual switch-ids.

Unlike the access/aggregation network topology, leaf/spine topology, with Layer 3 termination at ToR switches can involve dual-homed hosts, without dual-homed switches (e.g., a single switch at one tier connected to an emulated switch at another tier). For example, spine switches may not be configured as emulated switches, whereas leaf switches may be configured as emulated switches for directly connected hosts.

In the leaf/spine network topology typically, Layer 3 termination at the ToR switches currently cannot distinguish between dual-homed hosts and non-dual-homed hosts, and all forwarding may be based on individual switch-ids (rather than emulated switch-ids, if present). For example, ToR switches currently do not send HSRP Hellos with VIPs or vMACs for emulated switches. One reason for the lack of HSRP is the sheer number of ToR switches—typical data centers may have a large number of ToR switches, and configuring HSRP per pair of ToR switches can be painful and resource intensive; besides, HSRP has its own control plane that may have to be separately managed. Thus, each ToR switch may maintain two entries corresponding to each host, indicating the dual-homed host address reachability from both the ToRs that are part of the emulated switch. For a large data center with several thousand switches, burning two entries for every dual-homed host can lead to inefficient use of hardware space.

Note that while dual-homed hosts attached to a certain emulated-switch can share the same next-hop entries at remote switches, the number of next-hop entries to be burnt for dual-homed hosts is in the order of the number of ToR switches, independent of whether they are single-homed or dual-homed. In a full dual-homed environment, in which each pair of switches is represented as an emulated switch, the number of next-hop entries burnt should be in the order of the number of emulated switches in the network (i.e. half the number of ToR switches). However, such is not the case in existing network architectures.

Communication system 10 is configured to address these issues (and others) in offering a system and method for optimizing next-hop table space in a dual-homed network environment. Embodiments of communication system 10 can associate an ES-IP address and an ES-MAC address with an ES-ID of emulated switch 22 (which includes ToR switches 18(1) and 18(2)) directly connected to dual-homed host 16(1) (for example) having a host IP address 1.1.1.1 in network 12 and populate a host route table of a third ToR switch 18(3)

with a mapping between the host IP address and the ES-IP address. In some embodiments, the ES-MAC address can be derived from the ES-ID, for example, in a manner similar to HSRP/VRRP/FHRP like protocols, where a set of MAC prefixes are reserved and the HSRP group ID is appended at the end. For example, a set of MAC prefixes may be reserved and the ES-ID may be appended at the end to obtain the ES-MAC address.

In addition, each of ToR switches 18 may have a unique switch IP address for next-hop reachability for single-homed hosts 14. A suitable routing protocol, such as iBGP may be used to advertise the ES-IP address as a next-hop address for substantially all corresponding dual-homed hosts 16 in network 12, and the individual switch IP addresses as the next hop addresses for substantially all corresponding single-homed hosts 14 in network 12. In various embodiments, emulated switch 22 may also advertise the ES-MAC address associated with the ES-ID. The ES-MAC address may be resolved to the ES-ID in the MAC address tables of ToR switches 18, according to usual IS-IS and Link State Routing Protocols.

For example, emulated switch 22 with ES-IP address of 192.168.1.111 may advertise the ES-IP address as the next hop address for hosts 16(1) and 16(2). In an example embodiment, ToR switch 18(1) may advertise ES-IP address 192.168.1.111 as the next hop address for dual-homed host 16(1). Likewise, ToR switch 18(2) may advertise the same ES-IP address 192.168.1.111 as the next hop address for the same dual-homed host 16(1). Thus, remote ToR switch 18(3) may receive duplicate advertisements for same dual-homed host 16(1). ToR switch 18(1) may ignore the duplicate information and populate its host route table with the ES-IP address information appropriately. Additionally, ToR switch 18(1) may advertise its individual IP address 192.168.1.1 as the next hop address for single homed host 14(1). Likewise, ToR switch 18(2) may advertise its individual IP address 192.168.1.2 as the next hop address for single-homed host 14(2).

During operation, an outgoing packet having the host IP address 1.1.1.1 as a destination address may be received at a host-facing port of ToR switch 18(3). ES-IP module 22(3) of ToR switch 18(3) may determine, from the host route table, the next-hop address as the ES-IP address. ToR switch 18(3) may send out an Address Resolution Protocol (ARP) request for a MAC address corresponding to the ES-IP address. A primary one of ToR switches 18(1) and 18(2) may respond with the ES-MAC address corresponding to the ES-IP address.

ToR switch 18(3) may determine the ES-ID from the ES-MAC address (for example, from a previously populated MAC address table, or as part of the ARP resolution process), and encapsulate the destination address of the outgoing packet with the ES-ID, and forward the packet to fabric spine 20. Fabric spine 20 may determine a best cost route to emulated switch 22 and forward the packet accordingly. The packet may be decapsulated at emulated switch 22 (e.g., either by ToR switch 18(1) or 18(2)) and forwarded on to host 16(1). Using the ES-IP address for emulated switch 22 can allow substantially every dual-homed host 16 to employ a single next-hop entry, thereby reducing the next-hop table usage on ToR switches 18.

In various embodiments, if one of the links from emulated switch 22 to dual-homed host 16(1) (for example) fails, traffic may be forwarded via the peer switch. The peer switch may be reachable via fabric spine 20 or via the peer link. Eventually when the failed link comes back up, traffic can be forwarded to dual-homed host 16(1) via the locally attached link. Forwarding Information Base (FIB) entries corresponding to dual-homed host 16(1) may not be required to be updated on remote ToR switches 18.

In other embodiments, if the failed link is likely to be down for a long time (e.g., making dual-homed host 16(1) similar to a single-homed host) and the two-hop path through fabric spine 20 is a concern (e.g., to reduce the number of hops), the following alternative can be employed. Assume, merely for ease of illustration, and not as a limitation, that the link from dual-homed host 16(1) to ToR switch 18(1) fails. Peer ToR switch 18(2) may advertise its individual switch IP address as the next-hop on a suitable routing protocol such as iBGP for dual-homed host 16(1). Remote ToR switches (e.g., ToR switch 18(3)) may install ECMP entries for dual-homed host 16(1) with the ES-IP and the individual switch IP address of ToR switch 18(2). When the routing advertisement reaches ToR switch 18(1), it may send out a "withdraw" for the host route associated with the ES-IP address. Consequently, remote ToR switches (e.g., ToR switch 18(3)) may transition to employing only ToR switch 18(2) for reaching host 16(1).

Embodiments of communication system 10 can provide various advantages. For example, only one next-hop entry, instead of two, may be burnt in remote ToR switches 18 for dual-homed hosts 16(1) and 16(2) behind emulated switch 22. Embodiments of communication system 10 can take advantage of the built-in IS-IS mechanisms for emulated switch ID advertisement, and extend it to Layer 3 forwarding without any changes to the IS-IS protocols. Moreover, additional Type-Length-Values (TLVs) are also not called for to implement various operations according to the embodiments. Another advantage can include leveraging IS-IS Layer 2 mechanisms on switch failure. For example, on an emulated switch peer failure, typically spine switches (in fabric spine 20) directly connected to the failed peer can detect the failure and communicate the failure to the other switches in network 12. IS-IS mechanisms may adapt to the failure and stop forwarding traffic destined to the failed peer. The mechanism may be leveraged for Layer 3 traffic as well in various embodiments.

The operations associated with the various embodiments can be simple to implement. For example, no changes may be necessary to existing protocols for TRILL, FabricPath, or equivalent deployments. The emulated-switch extension introduced in IS-IS can be leveraged for Layer 3 forwarding. Moreover, emulated switch peer failure may not require reprogramming of any Layer 3 FIB or adjacency entries in remote ToR switches 18. Additionally, emulated switch peer failure may not incur Layer 3 host control plane churn. The operations that may be associated with embodiments of communication system 10 may be independent of the overlay employed for data traffic, and can be extended to operate with TRILL and other Layer 2 overlays.

Turning to the infrastructure of communication system 10, the network topology can include any number of hosts, virtual machines, switches, routers, and other nodes interconnected to form a large and complex network 12. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the architecture shown in FIG. 1 is simplified for ease of illustration. For example, network 12 may comprise access switches, aggregation switches, core switches to aggregate and distribute ingress (upstream traffic), and egress (downstream traffic) traffic, etc. A plurality of switches (virtual and/or physical) may be provided at each network level to achieve redundancy within network 12.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

According to various embodiments, ES-IP modules 22 may be part of the hardware of ToR switches 18, for example, implemented on appropriate semiconductor chips (e.g., Application Specific Integrated Circuits (ASICs)). ES-IP modules 22 may include appropriate hardware components (e.g., memory elements, processors, etc.) and associated processing capability (e.g., from instructions stored in appropriate hardware components) to perform the operations described herein. In other embodiments, ES-IP modules 22 may include applications and hardware that operate together to perform the operations described herein. For example, a portion of ES-IP modules 22 may be implemented in hardware, and another portion may be implemented in software, for example, as an application. As used herein, an "application" can be inclusive of an executable file comprising instructions that can be understood and processed on a computer, and may further include library modules loaded during execution, object files, system files, hardware logic, software logic, or any other executable modules. ES-IP module 22 may interface with the hardware of ToR switches 18 to perform the operations described herein.

In some embodiments, ES-IP modules 22 may be installed in each of ToR switches 18. In other embodiments, ES-IP modules 22 may be installed at one or more managing servers that can configure and control substantially all ToR switches 18. In still other embodiments, portions of ES-IP modules 22 may be installed at ToR switches 18 and the remaining portions of ES-IP modules 22 may be installed at the one or more managing servers. Various installation schemes are possible for ES-IP modules 22. Each of such installation schemes is included within the broad scope of the embodiments.

Fabric spine 20 may include one or more switches (or routers and such other network elements with routing, bridging, and switching functionalities) and other suitable network elements based on particular network topology considerations. Switches in fabric spine 20 may forward packets from and to ToR switches 18, enabling a single tier fabric in many embodiments. In some network topologies, fabric spine 20 may include one level of switches (e.g., 2 tier fat tree topology); in other network topologies, fabric spine 20 may include multiple levels of switches (e.g., 3 tier fat tree topology). Number of switches in fabric spines 18 may be based in particular network topology and performance considerations. Virtually any number of switches may be used in fabric spine 20 within the broad scope of the embodiments of communication system 10.

Figure 2:
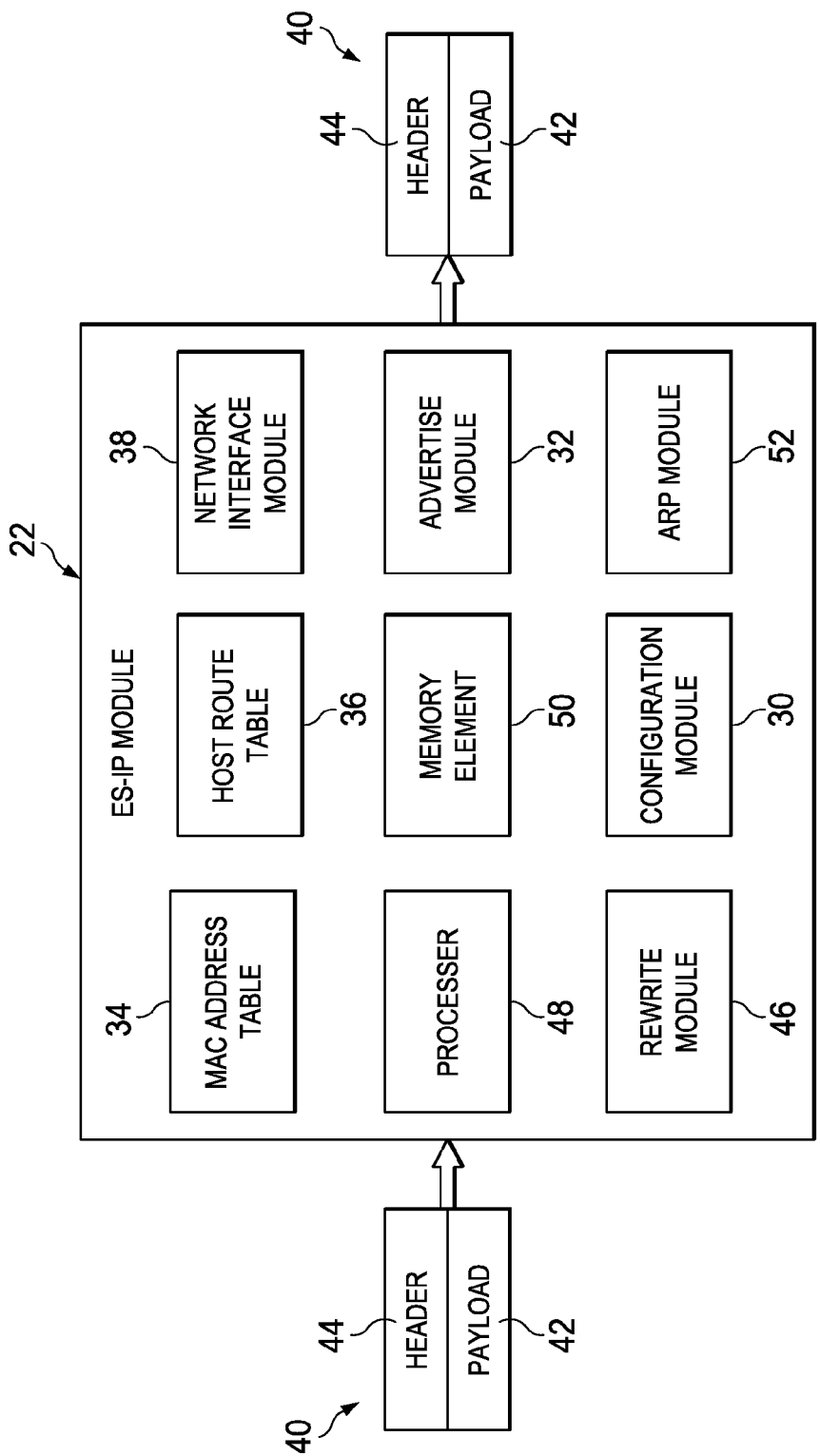
FIG. 2 is a simplified block diagram illustrating example details of the system in accordance with one embodiment.

Turning to FIG. 2, FIG. 2 is a simplified block diagram illustrating example details of an embodiment of communication system 10. Representative ES-IP module 22 may include a configuration module 30, which can facilitate configuring the ES-IP address, ES-MAC address and ES-ID associated with representative emulated switch 22. In some embodiments, configuration module 30 may be present only on emulated switches. In other embodiments, configuration module 30 may be present on substantially all ToR switches 18, but may be active only in emulated switches. In some embodiments, configuration module 30 may be located at a central management server, from where substantially all ToR switches 18 may be configured.

In some embodiments, network administrators may manually set up the ES-ID, ES-IP address, and ES-MAC address in configuration module 30. In other embodiments, automated mechanisms may be implemented to set up the ES-ID, ES-IP address, and ES-MAC address in configuration module 30. It may be noted that each emulated switch 22 may have a unique ES-ID, ES-IP address, and ES-MAC address that are not shared by other emulated switches, or by ToR switches 18, or by spine switches in fabric spine 20.

An advertise module 32 may advertise (e.g., via iBGP) the ES-IP address as the next hop address for directly connected dual-homed hosts 16. In some embodiments, advertise module 32 may also advertise the individual switch IP address as the next hop address for directly connected single-homed hosts 14. In some embodiments, advertise module 32 may also advertise the ES-MAC address associated with the ES-ID, as part of the IS-IS and Link State Routing Protocols. A MAC address table 34 may be populated with a mapping between MAC addresses and switch IDs of substantially all switches (including ToR switches 18) in network 12. The mapping may include mapping between ES-MAC address and ES-IDs of emulated switches.

A host route table 36 may be populated with the next hop IP addresses of connected hosts (both single-homed hosts 14 and dual-homed hosts 16). For example, each of single-homed hosts 14 may be associated with the switch IP address of the corresponding ToR switch 18, and each of dual-homed hosts 16 may be associated with the ES-IP address of the corresponding emulated switch 22.

A network interface module 38 may facilitate communicating (e.g., sending, receiving, transmitting, etc.) packet 40 (including data, advertisements, etc.) in network 12. Packet 40 may include a payload 42 and a header 44. Header 44 may include destination and source address information, including IP address (including ES-IP address), or switch ID (including ES-ID). A rewrite module 46 in ES-IP module 22 may facilitate encapsulating header 44 as appropriate (e.g., encapsulate with the ES-ID). A processor 48 and a memory element 50 may facilitate the operations described herein.

Figure 3:
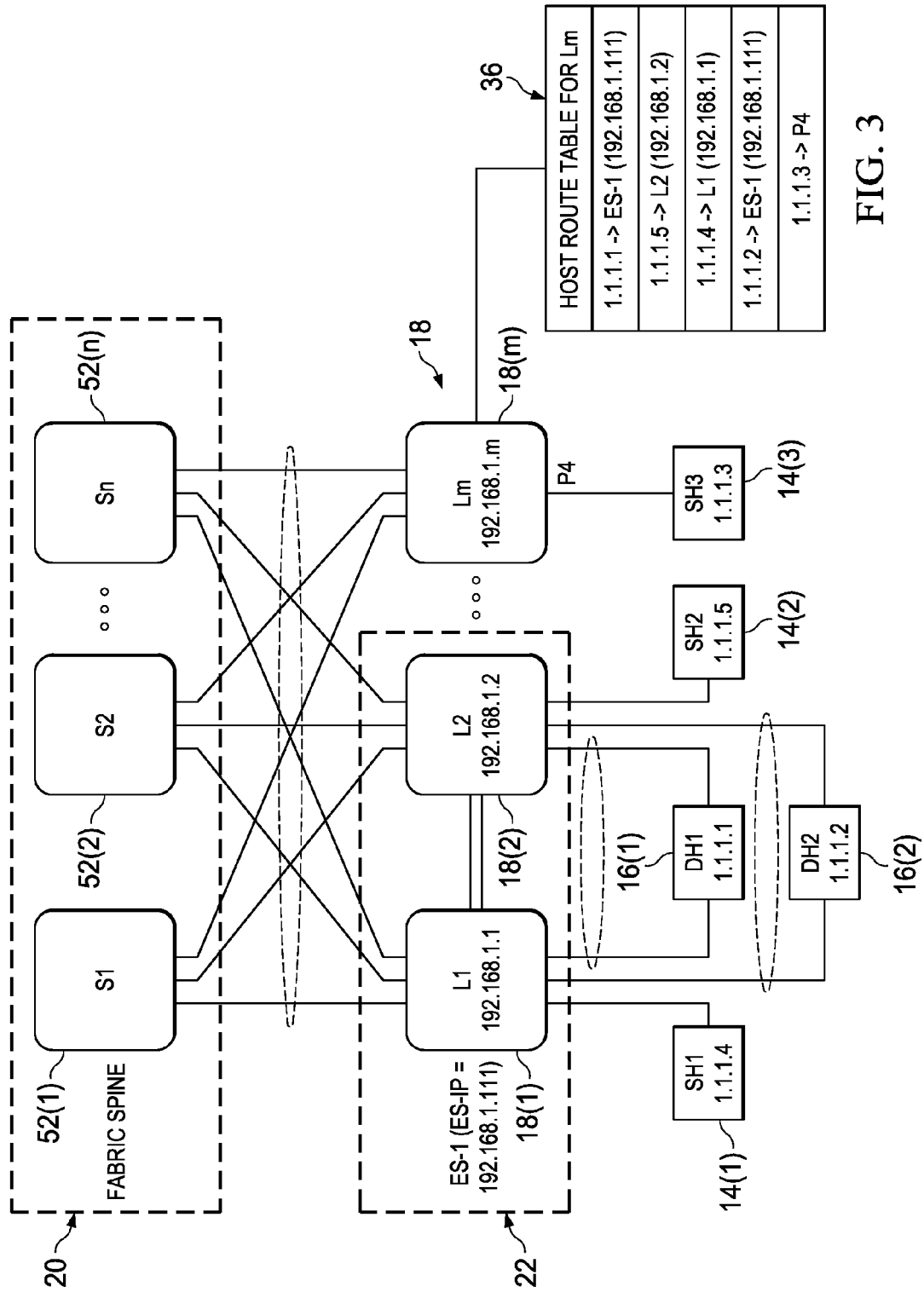
FIG. 3 is a simplified block diagram illustrating further example details of the system in accordance with one embodiment.

Turning to FIG. 3, FIG. 3 is a simplified block diagram illustrating an example embodiment of communication system 10. Fabric spine 20 may include a plurality of spine switches 52(1)-52(n) connected to ToR switches 18(1)-18(m). Several ToR switches 18(1)-18(m) may form a plurality of emulated switches to directly connected dual-homed hosts 16. For example, ToR switches 18(1) and 18(2) may form emulated switch 22 for dual-homed hosts 16(1) and 16(2). Assume, merely for illustrative purposes, and not as a limitation, that the ES-ID of emulated switch 22 is ES-1, with a corresponding ES-IP address of 192.168.1.111; the individual IP address of ToR switches 18(1)-18(m) are, respectively, 192.168.1.1, 192.168.1.2, . . . 192.168.1.m. Assume that IP address of host 16(1) is 1.1.1.1; IP address of host 16(2) is 1.1.1.2; IP address of host 14(3) is 1.1.1.3; IP address of host 14(1) is 1.1.1.4; IP address of host 14(2) is 1.1.1.5, etc. Assume that single-homed host 14(3) is connected on port P4 to ToR switch 18(m).

Host route table 36 for ToR switch 18(m) may include a mapping between IP addresses of hosts (single-homed hosts 14 and dual-homed hosts 16) and next hop addresses of the corresponding ToR switches 18. For example, 1.1.1.1 (corresponding to dual-homed host 16(1) is associated with 192.168.1.111 (the ES-IP address of emulated switch 22); 1.1.1.2 (corresponding to dual-homed host 16(2)) is also associated with 192.168.1.111; 1.1.1.4 (corresponding to single-homed host 14(1)) is associated with 192.168.1.1 (the individual switch IP address of ToR switch 18(1)); 1.1.1.5 (corresponding to single-homed host 14(2)) is associated with 192.168.1.2 (the individual switch IP address of ToR switch 18(2)); and 1.1.1.3 (corresponding to single-homed host 14(3)) is associated with port P4 of ToR switch 18(m).

A packet from single-homed host 14(3) destined to dual-homed host 16(1) may be received at ToR switch 18(m). Host route table 36 may indicate that the next hop address corresponding to 1.1.1.1, the destination IP address is 192.168.1.111, the ES-IP address of emulated switch 22. ToR switch 18(m) may send out an ARP request for the MAC address corresponding to the ES-IP address. ToR switch 18(1) may respond with the ES-MAC address. ToR switch 18(3) may determine the ES-ID corresponding to the ES-MAC address in its MAC address table. The header of the packet may be rewritten appropriately with the ES-ID, and forwarded over fabric spine 20 (through appropriate spine switches 52(1)-52(n)) to emulated switch 22, from where it may reach host 16(1).

Figure 4:
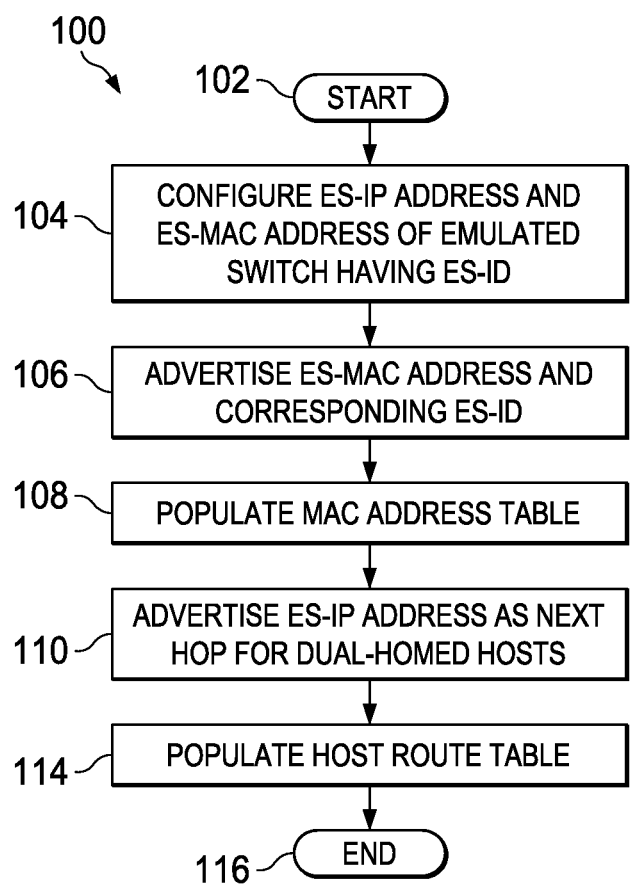
FIG. 4 is a simplified flow diagram illustrating example operations that may be associated with an embodiment of the system.

Turning to FIG. 4, FIG. 4 is a simplified flow diagram illustrating example operations that may be associated with configuration activities of embodiments of communication system 10. Operations 100 may start at 102, for example, when network 12 is provisioned. At 104, the ES-IP address and the ES-MAC address of emulated switch 22 having ES-ID may be configured. At 106, the ES-MAC address and corresponding ES-ID may be advertised via Link State Routing and IS-IS protocols. In one example embodiment, the ES-ID to ES-MAC mapping may be advertised via IS-IS or other topology discovery protocol. In another embodiment, ARP protocol may be used to learn the ES-ID to ES-MAC on demand. For example, the requesting ToR switch may learn the ES-MAC address based on a received ARP response.

At 108, MAC address table 34 of each of ToR switches 18 may be appropriately populated. At 110, ES-IP address may be advertised (via iBGP, for example) as next hop address of directly connected dual-homed hosts 16. At 112, host route table 36 may be appropriately populated. The configurations may end at 116.

Figure 5:
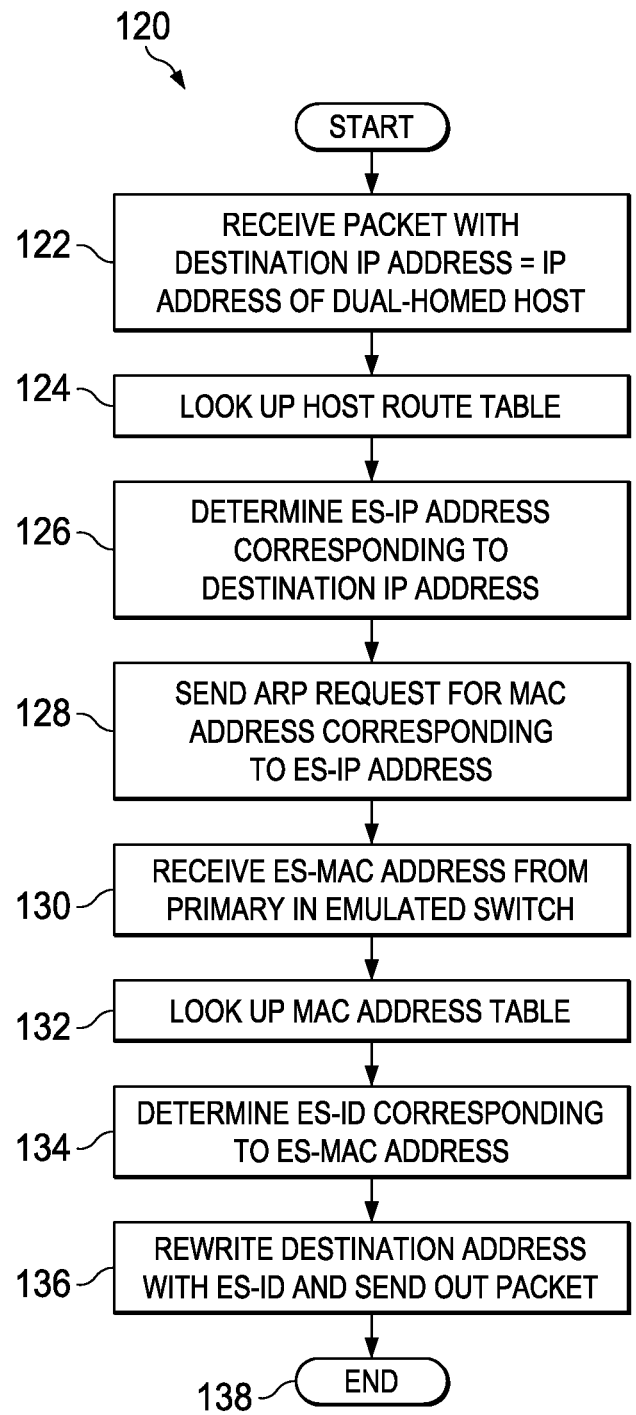
FIG. 5 is a simplified flow diagram illustrating further example operations that may be associated with an embodiment of the system.

Turning to FIG. 5, FIG. 5 is a simplified flow diagram illustrating example operations that may be associated with communication system 10 according to some embodiments. Operations 120 may include 122, at which packet 40 with the destination address being the IP address of one of dual-homed hosts 16. At 124, host route table 36 may be looked up. At 126, a determination may be made that ES-IP address corresponds to the next hop address for the destination IP address. At 128, an ARP request may be sent out for the MAC address corresponding to the ES-IP address. At 130, the ES-MAC address may be received from a primary peer of emulated switch 22.

At 132, MAC address table 32 may be looked up. At 134, a determination of the ES-ID corresponding to the ES-MAC address may be made. At 136, the destination IP address may be rewritten with the ES-ID and packet 40 may be forwarded to fabric spine 20 as appropriate. The operations may end at 138.

Figure 6:
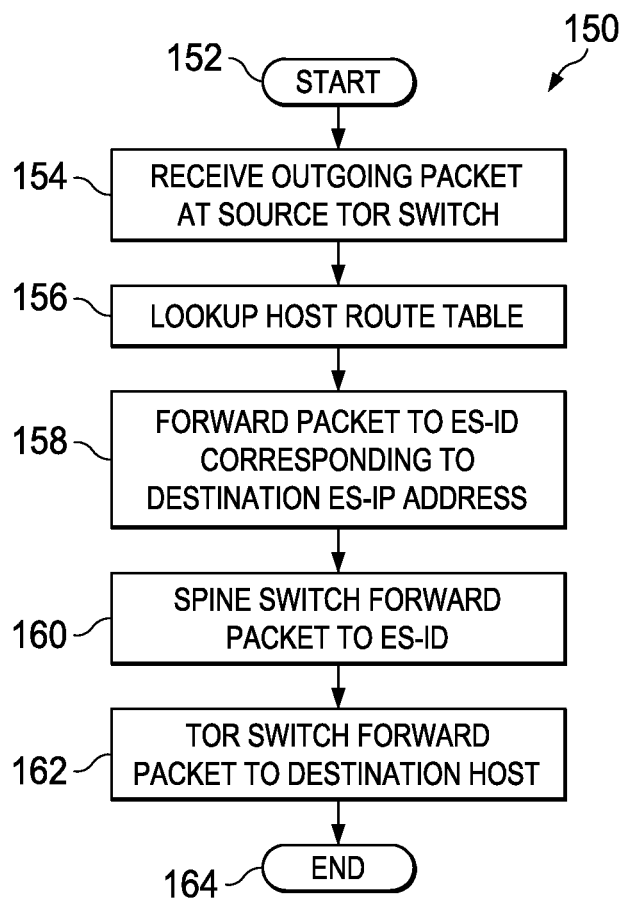
FIG. 6 is a simplified flow diagram illustrating yet other example operations that may be associated with an embodiment of the system.

Turning to FIG. 6, FIG. 6 is a simplified flow diagram illustrating example operations that may be associated with embodiments of communication system 10. Operations 150 may start at 152, for example, when packet 40 is sent out by host 14(3), destined to host 16(1). At 154, packet 40 may be received at source ToR switch 18(m), to which host 14(3) is directly connected. At 156, ToR switch 18(m) may lookup host route table 36 to determine the next hop IP address corresponding to the destination IP address. At 158, ToR switch 18(3) may forward packet 40 to the ES-ID corresponding to the destination IP address. At 160, one (or more) of spine switches 52(1)-52(n) may forward packet 40 to emulated switch 22 having the ES-ID. At 162, ToR switch 18(1) or 18(2) may forward packet 40 to host 16(1). The operations may end at 164.

Figure 7:
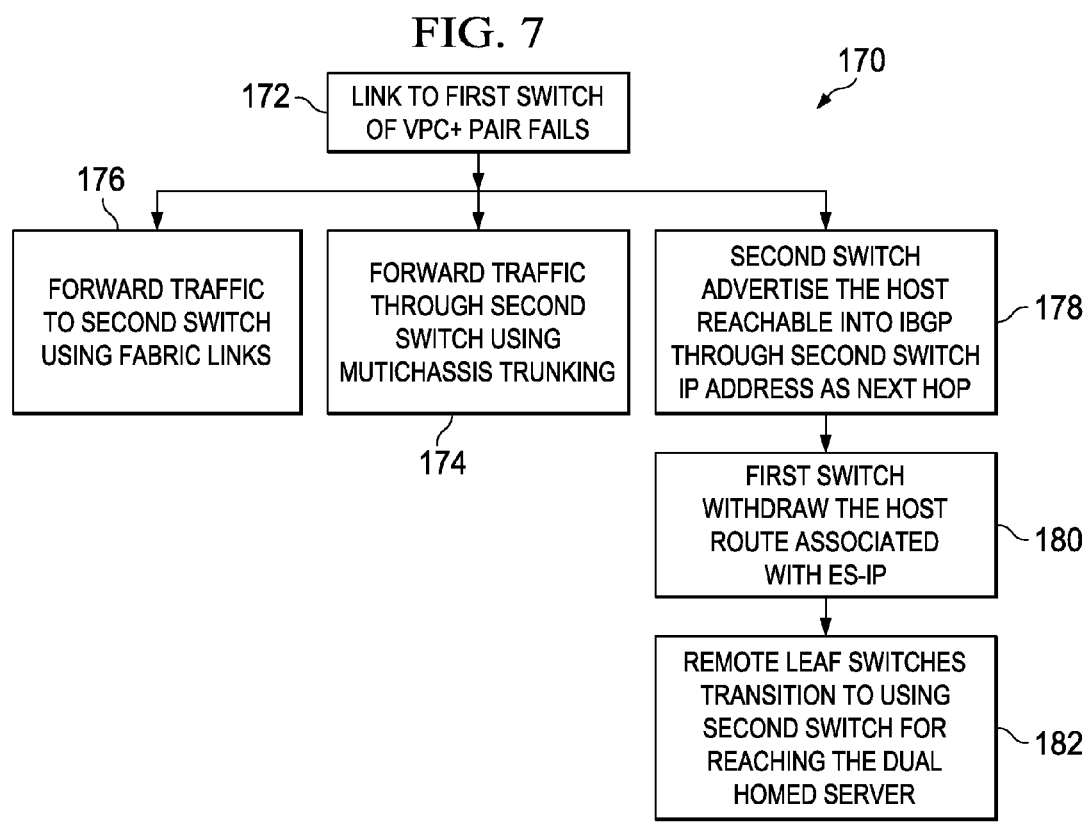
FIG. 7 is a simplified flow diagram illustrating yet other example operations that may be associated with an embodiment of the system.

Turning to FIG. 7, FIG. 7 is a simplified flow diagram illustrating example operations that may be associated with embodiments of communication system 10. Operations 170 may include 172, at which a link from a dual-homed host (e.g., host 16(1)) to a first switch (e.g., ToR switch 18(1)) of emulated switch 22 fails. At 174, traffic may be forwarded through a second switch (e.g., ToR switch 18(2)) using the peer link. Alternatively, traffic may be forwarded to the second switch using fabric links (e.g., the packet may be reflected back to fabric spine, and routed to the second switch) at 176. At 178, alternatively, the second switch may advertise the host reachable via an appropriate routing protocol, such as iBGP, through the second switch IP address as the next hop address. At 180, the first switch may withdraw the host route associated with the ES-IP address of emulated switch 22 (e.g., upon receiving the iBGP advertisement). At 182, remote ToR switches may transition to using the second switch for reaching the dual homed server.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, ES-IP modules 20. In some embodiments, one or more of these features may be implemented in hardware, provided external to these elements, or consolidated in any appropriate manner to achieve the intended functionality. The various network elements (e.g., ES-IP modules 20) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, ES-IP modules 20 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 50) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 48) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 50) for storing information to be used in achieving operations as outlined herein. These devices may further keep information in any suitable type of non-transitory storage medium (e.g., random access memory (RAM), read only memory (ROM), field programmable gate array (FPGA), EPROM, EEPROM, etc.), software, hardware, or in any other suitable component, device, element, or object where appropriate and based on particular needs. The information being tracked, sent, received, or stored in a communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    associating an Emulated Switch Internet Protocol (ES-IP) address and an Emulated Switch Media Access Control (ES-MAC) address with an Emulated Switch-IDentifier (ES-ID) of an emulated switch directly connected to a dual-homed host having a host IP address in a network environment, wherein the emulated switch comprises a first switch and a second switch; and
    populating a host route table of a third switch remote from the dual-homed host with a mapping between the host IP address and the ES-IP address.

2. The method of claim 1, further comprising:
    receiving an outgoing packet at the third switch, wherein the outgoing packet includes the host IP address as a destination address;
    determining, from the host route table, the ES-IP address corresponding to the host IP address;

sending out an Address Resolution Protocol (ARP) request for a Media Access Control (MAC) address corresponding to the ES-IP address;
receiving the ES-MAC address;
determining the ES-ID corresponding to the ES-MAC address;
encapsulating the outgoing packet with the ES-ID; and
forwarding the packet to a fourth switch in the network environment.

3. The method of claim 2, wherein a primary one of the first switch and the second switch sends the ES-MAC address.

4. The method of claim 2, wherein the first, second and third switches comprise Top of Rack (ToR) switches and the fourth switch comprises a spine switch, wherein the network environment comprises a leaf/spine network topology having an overlay based architecture using Link State Routing Protocols.

5. The method of claim 1, further comprising:
associating a first switch IP address and a first switch MAC address with a first switch ID of the first switch; and
associating a second switch IP address and a second switch MAC address with a second switch ID of the second switch, wherein the first switch IP address, the second switch IP address and the ES-IP address are different from each other, wherein the first switch MAC address, the second switch MAC address and the ES-MAC address are different from each other, and wherein the first switch ID, the second switch ID and the ES-ID are different from each other.

6. The method of claim 5, further comprising:
populating the host route table with a mapping between the first switch IP address and a second host IP address of a first single-homed host connected to the first switch; and
populating the host route table with a mapping between the second switch IP address and a third host IP address of a second single-homed host connected to the second switch.

7. The method of claim 1, further comprising:
if a link from the dual-homed host to the first switch fails, forwarding traffic to the dual-homed host exclusively through the second switch.

8. The method of claim 5, further comprising:
if a link from the dual-homed host to the first switch fails, advertising, via a routing protocol, the second switch IP address as a next hop address.

9. The method of claim 8, further comprising:
populating the host route table of the third switch with a mapping between the host IP address and the second switch IP address.

10. The method of claim 8, further comprising:
withdrawing a host route associated with the ES-ID when an advertisement according to the routing protocol reaches the first switch.

11. Logic encoded in non-transitory media that includes instructions for execution and, when executed by a processor, is operable to perform operations comprising:
associating an ES-IP address and an ES-MAC address with an ES-ID of emulated switch directly connected to a dual-homed host having a host IP address in a network environment, wherein the emulated switch comprises a first switch and a second switch; and
populating a host route table of a third switch remote from the dual-homed host with a mapping between the host IP address and the ES-IP address.

12. The logic of claim 11, further comprising:
receiving an outgoing packet at the third switch, wherein the outgoing packet includes the host IP address as a destination address;
determining, from the host route table, the ES-IP address corresponding to the host IP address;
sending out an ARP request for a MAC address corresponding to the ES-IP address;
receiving the ES-MAC address;
determining the ES-ID corresponding to the ES-MAC address;
encapsulating the outgoing packet with the ES-ID; and
forwarding the packet to a fourth switch in the network environment.

13. The logic of claim 12, wherein the first, second and third switches comprise ToR switches and the fourth switch comprises a spine switch, wherein the network environment comprises a leaf/spine network topology having an overlay based architecture using Link State Routing Protocols.

14. The logic of claim 11, further comprising:
if a link from the dual-homed host to the first switch fails, forwarding traffic to the dual-homed host exclusively through the second switch.

15. The logic of claim 11, further comprising:
if a link from the dual-homed host to the first switch fails, advertising, via a routing protocol, a second switch IP address as a next hop address.

16. An apparatus, comprising:
a configuration module;
a network interface module;
a memory element for storing data; and
a processor operable to execute instructions associated with the data, wherein the network interface module, the configuration module, the processor, and the memory element cooperate such that the apparatus is configured for:
receiving an association of an ES-IP address and an ES-MAC address with a ES-ID of emulated switch directly connected to a dual-homed host having a host IP address in a network environment, wherein the emulated switch comprises a first switch and a second switch; and
populating a host route table of a third switch remote from the dual-homed host with a mapping between the host IP address and the ES-IP address.

17. The apparatus logic of claim 16, further comprising a network interface module, an ARP module, and a rewrite module, wherein the apparatus is further configured for:
receiving an outgoing packet, wherein the outgoing packet includes the host IP address as a destination address;
determining, from the host route table, the ES-IP address corresponding to the host IP address;
sending out an ARP request for a MAC address corresponding to the ES-IP address;
receiving the ES-MAC address;
determining, from a MAC address table, the ES-ID corresponding to the ES-MAC address;
encapsulating the outgoing packet with the ES-ID; and
forwarding the packet to a fourth switch in the network environment.

18. The apparatus of claim 16, wherein the network environment comprises a leaf/spine network topology having an overlay based architecture using Link State Routing Protocols.

19. The apparatus of claim 16, wherein if a link from the dual-homed host to the first switch fails, traffic is forwarded to the dual-homed host exclusively through the second switch.

20. The apparatus of claim 16, wherein if a link from the dual-homed host to the first switch fails, advertising, via a routing protocol, a second switch IP address as a next hop address.

* * * * *